Feb. 26, 1963   J. J. CHASE ET AL   3,078,583
CONTOUR MEASURING AND CHECKING INSTRUMENT
Filed April 2, 1959   2 Sheets-Sheet 1
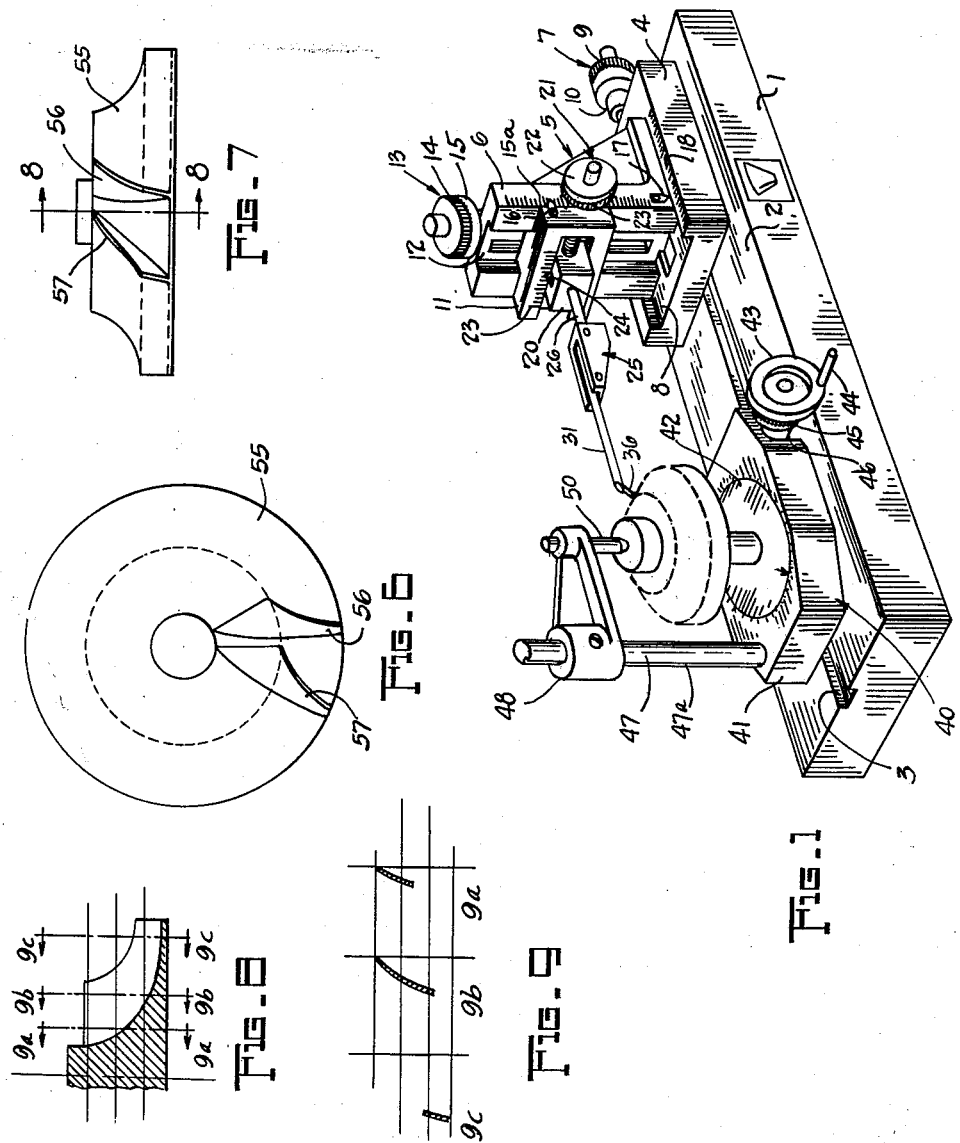
INVENTORS
J.J. CHASE
BY N.J. CONNAVINO
Robb+Robb
attorneys A United States Patent Office 3,078,583
Patented Feb. 26, 1963

3,078,583
CONTOUR MEASURING AND CHECKING
INSTRUMENT
Joseph J. Chase, Euclid, and Nick J. Connavino, South
Euclid, Ohio, assignors to Turbotronics Corporation,
Cleveland, Ohio, a corporation of Ohio
Filed Apr. 2, 1959, Ser. No. 803,793
9 Claims. (Cl. 33—174)

This invention relates to measuring and checking instruments and particularly to a novel combination of elements for precision measuring and checking in three dimensions.

While many instruments of various kinds have been heretofore suggested and used in the measuring and checking of various types of parts, the relatively recent development of devices which require extremely accurate construction, to effect certain required performance characteristics, makes the provision or ability to supply an instrument of the kind herein contemplated virtually necessary and extremely valuable as an adjunct to the equipment of precision manufacturers.

Whereas previously many individual elements for precision measurement have been available, and some have been used in different combinations, no single instrument has incorporated therein the various combinations of elements which will provide the necessary data now being sought in view of the technological advances made particularly in the aircraft and allied fields.

A very important aspect of the present invention as an improvement over previously available instruments, is the ability of such instrument as is described hereinafter, to effect non-destructive checking of parts which are so intricate or otherwise formed as to have uniformly heretofore required the destructive method as a basis for ascertaining compliance with dimensions laid down by the designer.

In the art to which this invention is directed, and particularly the phase thereof relating to checking of pump impellers and turbine wheels as examples, dimensional accuracy for duplication and performance is extremely important.

An example of the unique advantages hereof is that the instrument will provide data from a model which may have been constructed without basic drawings and thus no permanent dimensional record is available, which model may have been found to have highly desirable characteristics which should be duplicated and thus make possible subsequent reproduction of identical parts because recorded data will be available for such purposes.

One of the improvements afforded hereby is the extreme accuracy of measurement provided and the flexibility of the arrangement to enable checking and measuring of a wide range of type and size of products.

Another advantage made possible by the invention herein, is the rapidity with which a part may be set up preparatory to checking or measuring.

One of the special features of this invention is the design, construction and application of a probe unit which is a special form and affords movement of a probe element provided therein around an axis so as to refer dimensions to a line and avoid certain phases of calculation which in other types of instruments introduced errors obviously not desirable.

Another feature of this invention is the ability to incorporate in the construction of the instrument signalling means which under the most usual circumstances will be audible, but conceivably could be and may under some circumstances desirably be dependent upon pressures of very small magnitude.

This invention also contemplates the provision of means to effect centering of parts which allow such basis for checking and such centering being effected so as to improve the speed with which parts may be checked.

In conjunction with the centering heretofore referred to, an instrument is provided with means to make possible the establishment of central reference points for subsequent machining operations, as a result of establishment of the precise center desired.

The foregoing statements of the various aspects of this invention will readily suggest the objects hereof, and each of the aspects involved is in itself achieved and is an object hereof.

Other and further objects and features of this invention will be understood from a consideration of the specification appended hereto and shown in the drawings wherein:

FIGURE 1 is a perspective view of an instrument constructed in accordance with the concept hereof.

FIGURE 6 is a top plan view, partly fragmentary, illustrating a part which is susceptible of checking and measurement hereby.

FIGURE 7 is a side elevation of the view of FIGURE 6.

FIGURE 8 is a sectional view taken about on the line 8—8 of FIGURE 7 looking in the direction of the arrows.

FIGURE 9 is a lay-out of the sectional measurements taken about on the lines 9a—9a, 9b—9b, and 9c—9c, of FIGURE 8.

Figure 2:
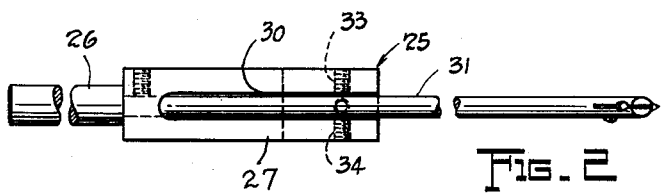
FIGURE 2 is a top plan view of a special probe construction availed of in the instrument.

Referring now to the drawings, and particularly FIGURE 1 initially, the instrument hereof is shown as being provided with a main base 1 having a highly accurately machined upper surface 2 thereon, and about centrally thereof the groove or channel 3 machined therein and extending longitudinally.

Adapted to be supported on the surface 2 is a base part 4 of a measuring head unit generally designated 5, said base part 4 being arranged to be guided and securely positioned with respect to the slot 3, and the base part 4 in turn supporting a vertical bracket 6. The vertical bracket 6 is adapted to be longitudinally positioned with respect to the base part by means of the micrometer adjusting means 7, otherwise designated the longitudinal micrometer actuating means. This longitudinal micrometer actuating means includes the usual screw, not shown, with a nut, likewise not shown, fastened to the vertical bracket 6 to provide for longitudinal movement of such bracket in the guide provided by the section 8 of such base part 4. The indicia on a dial 9 are provided and the usual reference dial 10 is likewise provided.

The vertical bracket is similarly formed to the base part so as to provide for the vertical movement by a vertically movable member 11 likewise mounted so as to move up and down in the guide 12 as controlled by the micrometer actuating means generally designated 13, said means being connected to the member 11 in accordance with conventional practice, the dials such as 14 and 15 likewise being somewhat conventional for micrometer adjustment. This means 13 is otherwise designated as the vertical micrometer actuating means, suitable indicia being inscribed on the side of the bracket 6 as indicated at 15a, with a pointer 16 having reference thereto.

A pointer such as 17 may be provided at the lower portion of the bracket 6 to refer to indicia 18 inscribed in the upper surface of the base part 4.

A probe supporting unit 20 is transversely movable by means of the micrometer adjusting means generally designated 21, including the dials 22 and 23 suitably connected to the part 20 in accordance with known practice. Suitable indicia 23 is provided for reference to and by a pointer 24.

Figure 3:
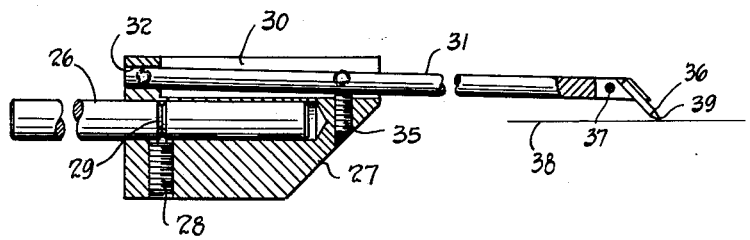
FIGURE 3 is a longitudinal sectional view of the probe shown in FIGURE 2.

A probe member more particularly shown in FIGURE 2 and generally designated 25 is supported on the probe supporting part 20 and is comprised of a shaft 26 adapted to be supported about centrally of the probe supporting part 20, said shaft 26 having mounted thereon the block 27 as indicated in FIGURE 3 by means of a spring pressed detent 28 engaging with a suitable groove 29 formed in the shaft 26.

The block 27 being suitably bored out to receive the shaft 26, is in addition provided with a groove 30 in the upper section as viewed in FIGURE 3, which groove 30 is intended to receive a probe member 31, engaged in a suitable opening 32 formed at the rear portion of the block 27, the forward portion of the probe member 31 being adjustably positioned by means of set screws such as 33 and 34 for transverse adjustment and 35 for vertical adjustment.

The probe member 31 is equipped at its outer end with a work piece contacting part 36, which part or element 36 is suitably gripped in a slot portion of the member 31 and a set screw 37 is provided to maintain the element 36 in precisely adjusted position. Such position is intended to be precisely on the centerline 38, with the point 39 of the element 36 terminating at such centerline, the centerline 38 being likewise the centerline of the shaft 26. It will thus be understood that rotation of the block 27 on the shaft 26 will cause the point 39 of the work piece contacting element 36 to remain on the centerline irrespective of the rotative position of the block 27 with respect to such centerline. This is a very important feature of the invention and makes possible the checking and measuring functions which the instrument is capable of performing.

Turning now to a consideration of FIGURE 1 again, at the left hand end of the main base 1, and supported on the surface 2 and guidingly engaged with the groove 3, is a work piece supporting unit 40, which unit 40 may of course be fixed with regard to the groove 3 in accordance with known mechanical practice.

The work piece supporting unit 40 includes a base member 41 supporting therein a rotary work piece supporting part 42, the work piece supporting part intended to be rotated by means of the micrometer positioning means 43, which includes suitable handle 44 and the necessary indicia on dials 45 and 46. The supporting part 42 is adapted to be rotated in a generally conventional manner which will be readily understood and necessary reference indicia for position of rotation are provided on the part 42 and in respect to the base member 41.

Figure 5:
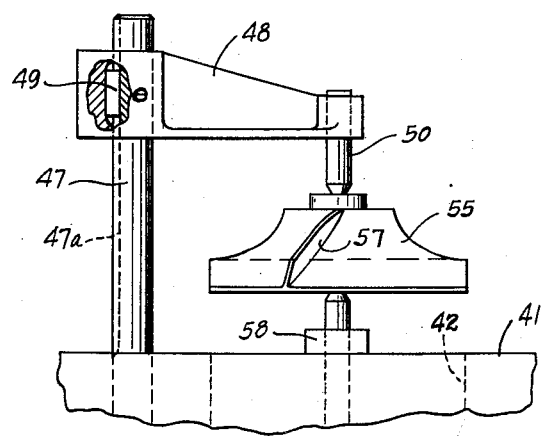
FIGURE 5 is a fragmentary view, in elevation, showing a feature of the invention relating to centering.

Suitably engaged with the base member 41 and extending upwardly therefrom is a post 47 having the offstanding arm 48 thereon, this arrangement being more particularly shown in FIGURE 5. The post 47 is provided with a key-way 47a therein, the keyway being engaged by a key 49 in the arm 48 the arm 48 having a removable centering member 50 at its extremity, the member 50 being equipped with a suitable center whereby the said center member 50 is precisely arranged so as to be exactly in line axially with the axis of the rotary work piece supporting part 42 previously mentioned. In order to describe in certain of its aspects, the particular function of the novel invention herein, the part disclosed in FIGURES 6, 7 and 8, will be referred to as a basis for the description of the manipulation of the various instrumentalities heretofore mentioned.

If it be assumed that the part shown in FIGURE 7 and otherwise known in the art as a wheel or impeller for example, the same being designated 55, and including the blades such as 56 and 57 thereon, as is usually the case where checking of a wheel of this kind is desired, reference material as in the nature of drawings and other material will be available, which includes certain P-points.

With these P-points set down in the basic drawing used as a basis for checking, the part 55 will usually be provided with suitable centers along the axis thereof and thus as indicated in FIGURE 5 the center member 58 will be placed in the rotary work piece supporting part 42 and the arm 48 provided with the center 50 placed on the post 47 and the part 55 engaged thereby with the centers in alignment as will be understood.

In the event such centers are not initially provided, the part 55 may be supported in any preferred manner and by suitable manipulation of the measuring head unit, referring to the P-point, cause the said part 55 to be brought into accurate position with respect to the work piece supporting part 42 and connected thereto as by means of a shaft which may be integral with the part 55 as the same is cast or otherwise formed during the production thereof. When such shaft is placed in a suitable receptacle provided on the rotary work piece supporting part 42, the probe member 31 and contacting element 36 therefor are manipulated by the various longitudinal, vertical and transverse micrometer actuated means so as to refer the P-points properly to their necessary positions and thus bring the part 55 into center condition on the part 42. If the part 55 does not have an upper center machined therein or otherwise arranged so that it can be used as an axial mounting portion, the center member 50 may be removed and a suitable member capable of performing a center drilling operation, inserted in the portion of the arm 48 in place of the member 50 and thereby cause a machining of a center opening in the part 55.

After the center drilling operation is performed by a device mounted in the arm, the device is thereafter withdrawn so the member 50 may be placed therein. It will be noted that this is a novel concept inasmuch as this makes the instrument very flexible and provides for subsequent machining of the part 55 as will usually be required and necessary for the ultimate use of the part.

Assuming therefore that the part 55 has now been positioned as shown, in one way or another in the position corresponding to FIGURE 5, the part being only roughly indicated in FIGURE 1, the measuring head unit 5 will thereafter be manipulated so that the probe member 31 and work piece contacting element thereon will perform the checking function. If the part has been previously centered and arranged by means of the probe member 31 contacting the P-point with the work piece contacting element 36, no further manipulation of the unit 5 will be necessary but the checking of the part 55 may proceed forthwith.

Since it will be ordinarily impossible for the person doing the checking to accurately determine when the point 39 of the work piece contacting element 36 is in contact with the work piece or part 55, suitable electrical connections may be arranged whereby audible signal indicating the contact when made will be evident. This type of audible signalling arrangement is common and thus not otherwise described. Hansen Patent 1,553,814 shows a circuit for a signaling arrangement which could be used for an audible signal as well. Suffice it to say that the part 55 must of course be metallic or capable of transmitting and completing a circuit appropriately arranged with regard thereto. In the event that the part 55 is not of a metallic nature, a suitable pressure operated probe or work piece contacting element may be provided similarly hooked up to an audible or otherwise visible signalling system.

Since the part 55 will now be assumed to have been positioned as indicated in FIGURES 1 and 5, the various measurements to be provided by the contact of the probe member 31 by the work piece contacting element 36 thereon will be availed of, so as to produce results somewhat along the lines of FIGURES 8 and 9. The section 9a—9a is representative of the portion at the right hand part of FIGURE 9 as to the blade contour. The thickness of the blade is ascertained by taking readings as necessary in manipulating the longitudinal, vertical and transverse micrometer actuating means, such readings being translated into suitable points of reference as indicated in the disclosure of FIGURE 9. Where a number of points are contacted by the work piece contacting element 36, and in turn placed on the disclosure of FIGURE 9, suitable connection of the points by a line will indicate the contour and thickness of the blade at that particular section. As will be apparent, contour and thickness of the three sections 9a—9a, 9b—9b, and 9c—9c, have been in turn translated onto the disclosure of FIGURE 9 reading from right to left respectively.

Figure 4:
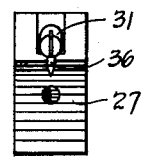
FIGURE 4 is an end view of the probe.

The probe instrumentalities otherwise shown in detail in FIGURES 2, 3, and 4, are of such a nature that the contacting point 39 is movable to either side of the centerline of the blade itself and will thus precisely permit the laying out of the blade thickness as indicated in FIGURE 9 at various positions with reference to the axis of the part 55. A large number of other points on each blade may be checked and referred to in order to ascertain whether they meet the requirements of the manufacturer of the part as will be readily understood.

From the foregoing general explanation, it will be further noted that where a turbine wheel or impeller such as is indicated in the drawings in FIGURES 6 and 7, is found to be particularly effective in its operation, even though made by hand and perhaps no drawing having been made, suitable dimensions may be obtained therefrom and laid out along the lines of FIGURES 8 and 9 so that a duplicate of the particular wheel or impeller such as 55 can be made. In such case of course the axis of the part will already have been established and thus the setting up of the part on the work support unit 40 will be vastly simplified.

The longitudinal, vertical and transverse micrometer adjustments which are provided, in conjunction with the novel probe instrumentalities which are movable about a longitudinal axis, vastly improve the possibilities of checking and measuring parts of the nature herein contemplated.

The use of the term "fixedly terminating" in the claims hereinafter set forth, is intended to point out that the measuring takes place in the instrument with regard to a fixed relationship established by the extremity or terminating portion of the element, and thus is fixed for measuring purposes. This is not to say that the probe element is absolutely immovable, but for measuring purposes would be so considered, in order to provide accurate measuring under all conditions.

We claim:

1. In an instrument of the class described, in combination, a base, a measuring head unit thereon, said head unit including longitudinal, vertical and transverse micrometer actuated means, a work support unit on said base, said units being longitudinally movable with respect to each other along the said base, and probe instrumentalities carried by the head unit aforesaid and adjustably positionable about an axis extending through said head unit, said instrumentalities including an element fixedly arranged to effect and maintain an adjusted position in contact with a workpiece at any point on and around the axis upon which such instrumentalities are supported, said adjustable positioning being in a 360 degree continuous traverse to any selected position, and means for securing said probe instrumentalities at any selected position in said traverse.

2. In an instrument of the class described, in combination, a base, a measuring head unit thereon, a work support unit on said base, said work support unit having a rotary workpiece supporting part, and micrometer indicating positioning means therefor, and axially rotatable and adjustably positionable probe instrumentalities carried on an axis extending from said head unit, said instrumentalities including an element fixedly arranged to be maintained in contact with a workpiece in all adjusted positions around the axis of said instrumentalities, said adjustable positioning being in a 360 degree continuous traverse to any selected position, and means for securing said instrumentalities at any selected position in said traverse.

3. In an instrument of the class described, in combination, a base, a measuring head unit thereon, said measuring head unit including a probe supporting part arranged to be precisely positioned longitudinally, vertically and transversely, and a rotatable probe member carried by said part, said probe member being adjustably positionable and having an element to maintain contact on the axis of said member, said element fixedly terminating at said axis for measuring purposes irrespective of the adjusted position of said member, said adjustable positioning being in a 360 degree continuous traverse to any selected position, and means for securing said member at any selected position in said traverse.

4. In an instrument of the class described, in combination, a base, a measuring head unit thereon, said measuring head unit including a probe supporting part arranged to be precisely positioned longitudinally, vertically and transversely, and a probe member extending from said part and adjustably positionable about a longitudinal axis, said member including an element fixedly terminating at said axis for measuring purposes irrespective of an adjusted position of said member, said adjustable positioning being in a 360 degree continuous traverse to any selected position, and means for securing said member at any selected position in said traverse.

5. In an instrument of the class described, in combination, a base, a measuring head unit thereon, said measuring head unit including a probe supporting part arranged to be precisely positioned longitudinally, vertically and transversely, a probe member extending from said part and adjustably positionable about a longitudinal axis, said member including an element fixedly terminating at said axis for measuring purposes irrespective of an adjusted position of said member, and said adjustable positioning being in a 360 degree continuous traverse to any selected position, means for securing said member at any selected position in said traverse, and a work support unit on said base having a rotatable part for supporting a workpiece therein.

6. In an instrument of the class described, in combination, a base, a measuring head unit thereon, said measuring head unit including a probe supporting part arranged to be precisely positioned longitudinally, vertically and transversely, a probe member carried by said part and having means adjustably positionable about a longitudinal axis, said member including an element fixedly terminating at said axis for measuring purposes, irrespective of an adjusted position of said member, said adjustable positioning being in a 360 degree continuous traverse to any selected position, means for securing said member at any selected position in said traverse, and a work support unit on said base having a rotatable workpiece supporting part, micrometer indicating positioning means being arranged to actuate the workpiece supporting part whereby to adjust the same relative to the probe supporting part.

7. In an instrument of the class described, in combination, a base, a measuring head unit thereon, said measuring head unit including a probe supporting part to be precisely positioned longitudinally, vertically and transversely, a probe member carried by said part and adjustably positionable around a longitudinal axis, said member including an element fixedly terminating at said axis for measuring purposes, irrespective of an adjusted position of said member, said adjustable positioning being in a 360 degree continuous traverse to any selected position, and means for securing said member at any selected position in said traverse, and a work support unit on said base, said support unit having a rotary table and micrometer adjusting means therefor, whereby to position a workpiece mounted on said table with respect to the said probe part.

8. In an instrument of the class described, in combination, a base, a measuring head unit thereon and movable with respect thereto, a work support unit on said base and movable with respect thereto, and probe instrumentalities carried by said head unit, said instrumentalities including a member extending therefrom and adjustably positionable about a longitudinal axis, said member including an element fixedly terminating at said axis for measuring purposes, irrespective of an adjusted position of said member, said adjustable positioning being in a 360 degree continuous traverse to any selected position, means for securing said member at any selected position in said traverse, and means for shifting said axis transversely and vertically.

9. In an instrument of the class described, in combination, a base, a measuring head unit thereon, said unit having measuring indicia from which the position of said head unit may be determined, said head unit including a probe supporting part arranged to be precisely positioned longitudinally, vertically and transversely, and a probe member extending from said part and adjustably positionable about a longitudinal axis, said member including an element having a portion fixedly terminating at said axis for measuring purposes, irrespective of an adjusted position of said member, said adjustable positioning being in a 360 degree continuous traverse to any selected position, and means for securing said member at any selected position in said traverse.

References Cited in the file of this patent

UNITED STATES PATENTS

| | | |
|---|---|---|
| 1,032,999 | Flint | July 16, 1912 |
| 1,265,423 | Burnett | May 7, 1918 |
| 1,467,403 | Toomey | Sept. 11, 1923 |
| 2,354,137 | Nystrom | July 18, 1944 |
| 2,504,961 | Braaten | Apr. 25, 1950 |
| 2,554,171 | Brunot | May 22, 1951 |
| 2,637,908 | Hedman | May 12, 1953 |
| 2,648,912 | Osgood | Aug. 18, 1953 |
| 2,703,456 | Smyth | Mar. 8, 1955 |
| 2,753,634 | Tamplin | July 10, 1956 |
| 2,941,300 | Aller et al. | June 21, 1960 |
| 2,982,028 | Donohoe | May 2, 1961 |
| 2,998,658 | Pergande | Sept. 5, 1961 |